US009089979B2

(12) United States Patent
Hodge

(10) Patent No.: US 9,089,979 B2
(45) Date of Patent: Jul. 28, 2015

(54) APPARATUS AND METHOD FOR CUSTOMLY CALIBRATING A CUTTING BLADE SET FOR A HAIR CLIPPER

(71) Applicant: Morono Hodge, Washington, DC (US)

(72) Inventor: Morono Hodge, Washington, DC (US)

( * ) Notice: Subject to any disclaimer, the term of this patent is extended or adjusted under 35 U.S.C. 154(b) by 133 days.

(21) Appl. No.: 14/099,631

(22) Filed: Dec. 6, 2013

(65) Prior Publication Data

US 2015/0158189 A1 Jun. 11, 2015

(51) Int. Cl.
*B23Q 17/22* (2006.01)
*B26B 19/38* (2006.01)

(52) U.S. Cl.
CPC .................................. *B26B 19/3826* (2013.01)

(58) Field of Classification Search
CPC ............. B23Q 17/2216; B23Q 17/223; B26B 19/3806
USPC ............................ 33/628, 630, 631, 633, 634
See application file for complete search history.

(56) References Cited

U.S. PATENT DOCUMENTS 2,700,993 A 2/1955 Pence
2,826,812 A * 3/1958 Haislip ........................ 30/34.05
3,028,888 A 4/1962 Chapin et al.
3,894,340 A 7/1975 Ellis, Jr.
4,007,542 A 2/1977 Bergendorff
4,368,745 A 1/1983 McGuffey
4,499,898 A 2/1985 Knepshield et al.
4,630,378 A 12/1986 Kulp et al.
4,700,489 A 10/1987 Vasile
5,329,703 A 7/1994 Craig
5,817,097 A 10/1998 Howard et al.
6,044,558 A * 4/2000 Wu ................................ 30/34.1
6,434,852 B1 * 8/2002 Tarris et al. ...................... 33/640
7,171,758 B2 2/2007 Brueckert et al.
7,171,760 B1 * 2/2007 Lemon ............................ 33/628
7,245,199 B1 7/2007 Reilly
7,290,349 B1 11/2007 Carpenter
7,350,314 B2 4/2008 McCambridge et al.
7,735,237 B1 6/2010 Moon
8,479,630 B2 7/2013 Osbourne
2007/0144025 A1 6/2007 McCambridge et al.
2008/0222906 A1 9/2008 Austin
2010/0101596 A1 4/2010 Regalado et al.
2012/0198716 A1 8/2012 Tonges et al.
2012/0272540 A1 11/2012 Ornelaz, Jr.
2014/0331504 A1 * 11/2014 Michel ......................... 30/233.5

OTHER PUBLICATIONS https://www.andis.com/bladegapper, Andis Blade Zero Gapper—2011 Andis Company.
http://www.justrightsharpening.com/bladesetter.html, Blade Setter, Division of , A15-11 for T Outliner & Outliner II.
(This is an audio demo video—not a document) http://www.youtube.com/watch?v=uQD8aBT619c—Andis zero gapper blade adjuster.

(Continued)

*Primary Examiner* — G. Bradley Bennett
(74) *Attorney, Agent, or Firm* — Winston & Strawn LLP

(57) ABSTRACT

The present invention provides a barber instrumentality useful for accurate and reproducible adjustment of the cutting blades used by hair clippers. Methods are also provided herein for the use of the instrumentality wherein precise adjustments can be made to reproduce fixed distances between a cutting blade and a guide blade of a hair clipper.

15 Claims, 4 Drawing Sheets

(56) References Cited

OTHER PUBLICATIONS (This is an audio demo video—not a document) http://www.youtube.com/watch?v=2ITE8INAoak—John Mansi, Anivo blade adjuster.

(This is an audio demo video—not a document) http://www.youtube.com/watch?v=ADIDINsCMTkc—how to adjust andis t-outliner blade, how to adjust andis out liner blade part 2.

* cited by examiner

APPARATUS AND METHOD FOR CUSTOMLY CALIBRATING A CUTTING BLADE SET FOR A HAIR CLIPPER

FIELD OF INVENTION

This invention relates to the field of hair styling products in general, and more particularly, relates to facilitation of accurate and reproducible calibration of fixed distances between a cutting blade and a guide blade of a hair clipper.

BACKGROUND OF THE INVENTION

Hair styling involves techniques that require creativity and technical precision. Training and experience are paramount to being successful at hair styling. However, even the most highly trained and experienced stylist must deal with different hair types, different skin sensitivities, and with customers that request and expect precision cuts and styles. One specific challenge to many stylists or barbers is the need to accurately and reproducibly provide a certain length of hair during the same hair cut as well as between independent haircuts while taking into account the customer's unique hair type and skin sensitivity. The length of hair, when trimmed using standard hair clippers, is directly related to the distance between the cutting edges of the cutting blade and the guide blade of traditional hair clippers. In order to reproducibly provide accurate trim length, the barber must utilize the same distance between these blade edges each time and within the same haircut. Normal wear and tear of the hair clippers can cause changes in the distance between the two blade edges. The change in distance between the blade edges, regardless of cause, can be unpredictable and inconsistent.

For a barber to obtain a consistent haircut within the same and between independent trims of a client, the barber must be able to calibrate the clippers by resetting the clippers' cutting and guide blades to a desired distance in relation to each other. Of particular concern for a stylist or especially a barber are those customers that have very short hair, where slight imperfections in length, shape, or angles of hair along the hairline are highly noticeable and undesirable. Similarly, a skilled barber would have a strong interest in being able to replicate prior, unique haircuts for individual clients, i.e., the ability to customly calibrate clippers for each client.

Currently known tools for calibrating cutting and guide blade distances are different from the current invention in specific and critical ways. Prior tools, such as that disclosed in U.S. Pat. Application No. 20120198716, are focused on simply a resetting of the factory distances between the cutting and guide blades. These tools do not provide any customization of the distances between the blades—instead a solid "block [that] has the exact form of a perfectly adjusted set of trimmer blades." (¶ 0023). This disclosure clearly only envisions one fixed and pre-determined distance between the cutting and guide blades, rather than the customizable distances provided by the instant invention. These tools also do not provide a slideable guide plate necessary to accomplish said customizable distances. Similarly, U.S. Pat. No. 7,290,349 to Carpenter discloses a tool for setting distances between the "reciprocating" and "stationary" blades of electric hair trimmers However, this disclosure also fails to provide the user the capability of customizing the distances between the two blades of the trimmer per the preference or request of the client, Instead, as shown in FIG. 1 of the '349 patent, there is only one setting for the distance between the two blades. Claim 10reiterates this disclosure by stating that the "clearance between a reciprocating blade and a stationary blade about 0.024 and 0.025 inches." There is no disclosure in this reference of varying the distance between the two blades' edges nor is there any support for modifying the disclosed tool to achieve the same.

While it is known in the art that adjustable distances between the edges of the cutting blade and guide blade are desired, any disclosure of how to accomplish a custom distance is minimal and distinct from the instant invention. For example, U.S. Pat. No. 7,350,314 to McCambridge discloses setting an offset between the cutting and guide blades. The '314 patent fails to disclose use of the device for different size blade sets for use with a variety of commercially-available clippers, as is possible with and encompassed by the instant invention.

The present invention is directed to overcoming the issues and limitations of prior art tools set forth above.

SUMMARY OF THE INVENTION

The present invention is a novel apparatus that provides a user the ability to customly set a distance between the cutting and guide blades of any commercially available hair clipper. This is achieved by providing a console, comprising a wall normal to a flat base on one end of said base. A guide blade of a hair clipper can be slideably and transiently disposed on the base. Subsequently, a guide plate and cutting blade are disposed on top of the guide blade. A gauge is provided that is slideably disposed on the base and, in some embodiments, magnetically engaged with the base, that enables the guide blade and cutting blade teeth to engage the wall. A user can then customize the distance between the teeth of the guide blade and the cutting blade by providing an extendable attachment of a pre-set depth transiently disposed on the wall which only engages the cutting blade's teeth. Once the desired distance between the blades is established, guide screws connecting the guide blade, guide plate, and/or cutting blade can be tightened, maintaining the custom distance. This apparatus can be used for any size hair clippers. The extendable attachments of pre-set depth are also provided and allow for quick, reproducible distances within the same haircut and between independent haircuts of the same client.

Figure 1:
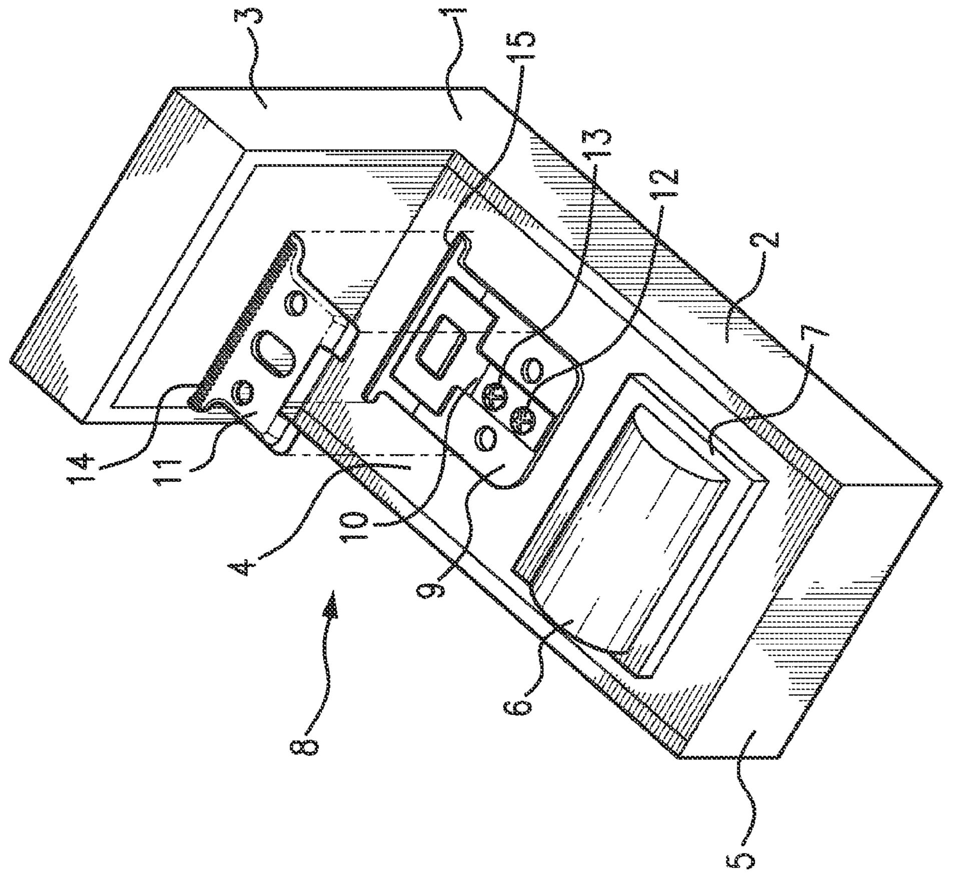
FIG. 1 is an overall view of one embodiment of the apparatus.

While the present invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents, and alternatives falling within the spirit and scope of the invention as defined by the claims.

DETAILED DESCRIPTION OF THE INVENTION

The novel apparatus depicted in FIG. 1 provides an L-shaped console (1) comprising a flat base (2) with a wall (3)

situated normal to said base (2). In an alternate preferred embodiment, the base (2) is covered with a material, including but not limited to a magnetically engageable material (4), such as iron or steel that is capable of being attracted by a magnet. Another embodiment provides that the wall (3) is covered with a material, including but not limited to the magnetically engageable material (4). Another embodiment provides that the base (2) and/or a wail (3) consists partially or entirely of a magnetically engageable material (5).

The apparatus includes a slideable gauge (6) slideably disposed on the base (2), and in some embodiments, comprising a magnet (7) so as to engage with the magnetically engageable material (4) of the base (2). The apparatus provides for any commercially available hair clipper blade set (8), comprising a guide blade (9), a guide plate (10), and a cutting blade (11). In one embodiment, the cutting blade (11) is attached to the guide plate (10). The guide plate (10) is then disposed on the guide blade (9) by two guide screws (12, 13), which, when tightened, fastens the guide plate (10) to the guide blade (9). These screws (12, 13) can be loosened by the user of the apparatus to slideably adjust the guide plate (10) (and hence the cutting blade (11)) relative to the guide blade (9).

When the base (2) is covered with a magnetically engageable material (4) or comprised partially or completely of a magnetically engageable material (5), the slideable gauge (6) can be moved in a direction towards the wall (3), engaging the blade set (8), resulting in the cutting blade teeth (14) and guide blade teeth (15) engaging the wall (3).

Figure 2:
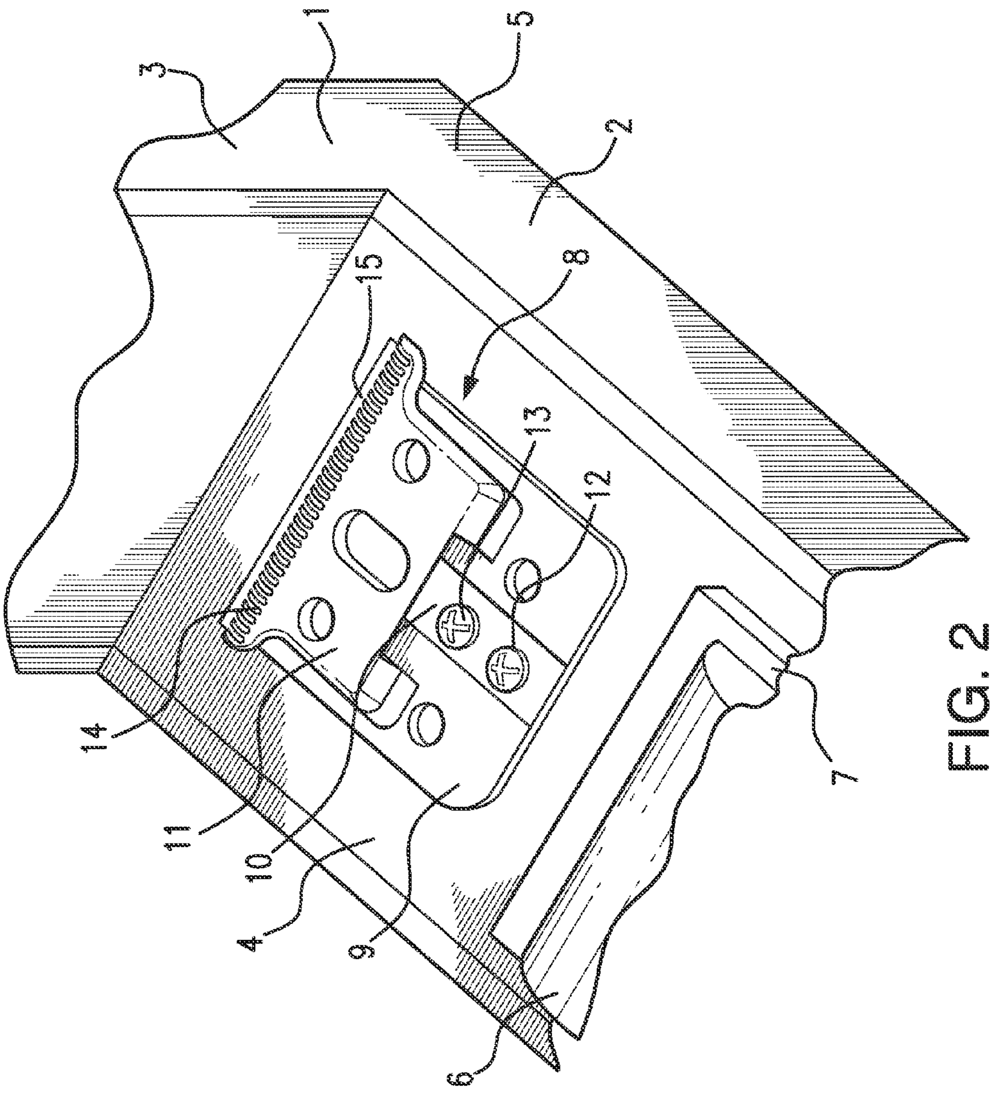
FIG. 2 provides a view of a clipper's cutting and guide blades disposed on the base of the console with the slideable gauge similarly disposed on the base of the console, in this embodiment, magnetically.

As depicted in FIG. 2, the invention caters to any size blade set (8), not being limited like prior art calibration tools which include a preset and pre-sized depression in the base. The invention also provides the ability to calibrate the blade set (8) with no offset between the guide blade teeth (15) and the cutting blade teeth (14), resulting in perfect alignment of the teeth (14, 15).

Figure 3:
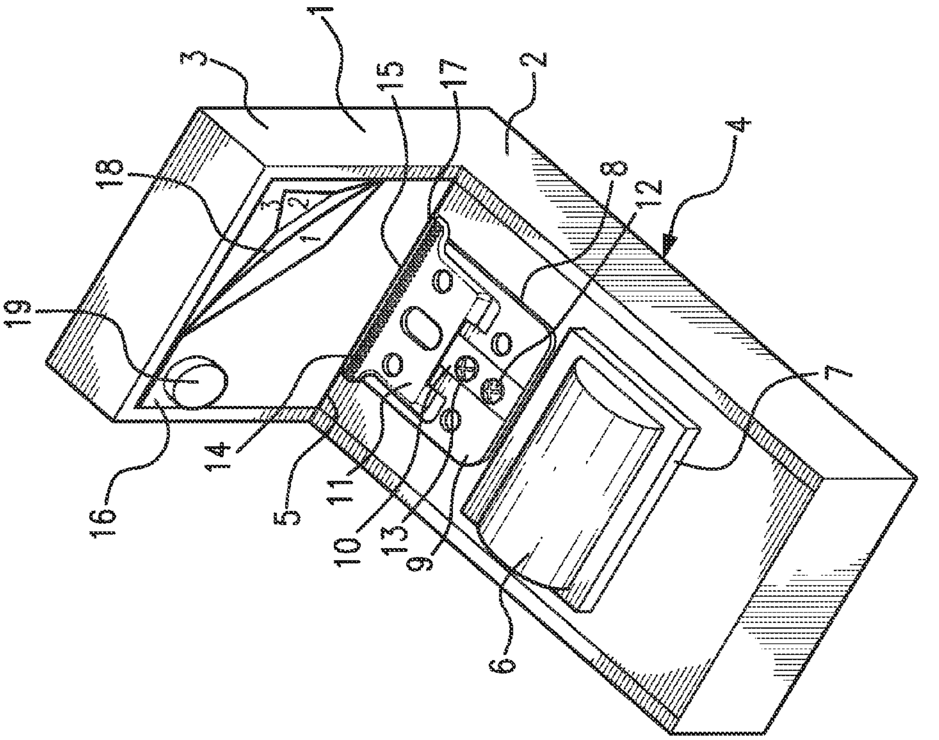
FIG. 3 shows the apparatus of FIG. 1 in use to accurately provide or reproduce a measurable and custom distance between the cutting blade teeth and the guide blade teeth by utilizing an extendable attachment transiently disposed on the wall of the console, and in this embodiment, magnetically.

In a preferred embodiment, as depicted in FIG. 3, when an extendible attachment (16) is transiently disposed on the wall (3), such that the cutting blade teeth (14) engages said extendible attachment (16), the distance (17) between the cutting blade teeth (14) and guide blade teeth (15) differs according to the depth of the extendable attachment (16). In the embodiment provided in FIG. 3, the invention enables the distance (17) between the cutting blade teeth (14) and guide blade teeth (15) to be slightly altered by the extension of the extendable attachment (16) to increase or decrease the distance (17). The invention embodied in FIG. 3 also provides the ability to utilize different extensions (18) of the extendable attachment (16) for each calibration—either within one haircut or between independent haircuts for one client; i.e., a barber could note that client A prefers one extension depth (17) while client B prefers another, different extension depth (17). Achieving any depth (17) (and therefore different distances between the cutting blade teeth (14) and guide blade teeth (15)) would be rapid and reproducible using the invention disclosed herein. Further, the extendible attachment (16) may comprise a magnet and/or be transiently disposed on the wall (3) via a magnet (19).

Figure 4:
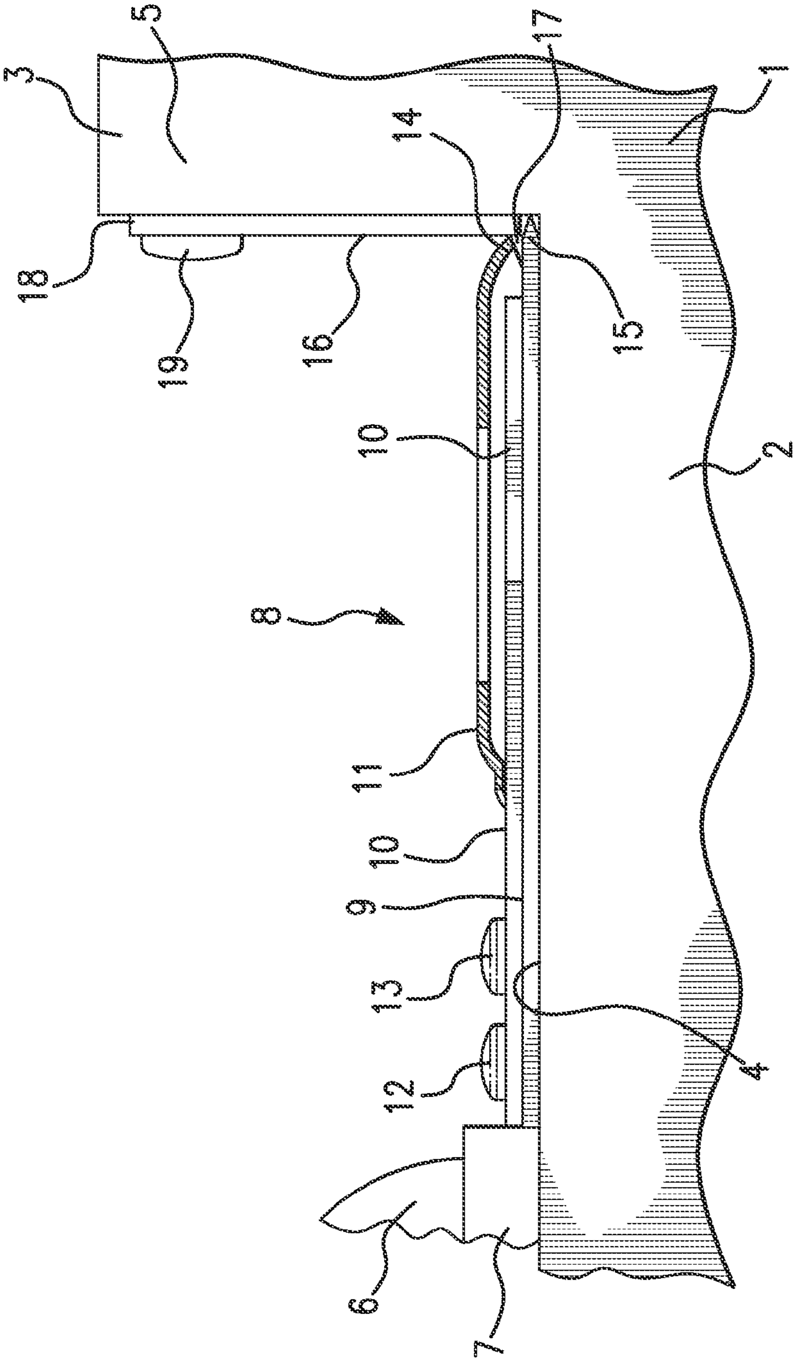
FIG. 4 provides an alternate view of the apparatus of FIG. 3.

In a preferred embodiment, as depicted in FIG. 4, a barber provides a blade set (8), comprising a cutting blade (11), a guide plate (10), and a guide blade (9), where the cutting blade (11) attaches to the guide plate (10) and the guide plate (10) and guide blade (9) are slideably attached to each other. The blade set (8) is disposed on the console base (2) with the teeth (14, 15) facing the console wall (3). The console (1) comprises a magnetically engageable material (4 or 5) and the slideable gauge (6) is composed of a magnet (7), such that the slideable gauge (6) can engage with the console base (2). The slideable gauge (6) is then moved toward the console wall (3) to engage the side of the blade set (8) opposite of the teeth (14, 15). The slideable gauge (6) can then be used to move the blade set (8) such that the guide blade teeth (15) engage the console wall (3), which is, in one embodiment, composed at least partially of a magnetically engageable material (5) and whereon an extendible attachment (16) with one or more extensions (18) of desired depth (17) is transiently disposed. Upon engagement by the cutting blade teeth (14) on the extendable attachment (16), a desired distance (17) between the cutting blade teeth (14) and guide blade teeth (15) is now provided. The guide screws (12, 13) can then be tightened in place to fix the distance (17) between the guide blade teeth (15) and cutting blade teeth (14). The blade set (8) can then be installed on its respective hair clipper.

Although various embodiments have been shown and described, the invention is not so limited and will be understood to include all such modifications and variations as would be apparent to one skilled in the art.

What is claimed is:

1. An apparatus for adjusting a cutting blade of a hair clipper, comprising:

an L-shaped console comprising magnetically engageable material having a flat base and a wall;

a cutting blade having a plurality of teeth;

a guide blade slideably disposed on the flat console base, the guide blade a plurality of teeth;

a guide plate slideably attached to the guide blade, the cutting blade mounted on the guide plate whereby the cutting blade is slideably adjustable relative to the guide blade;

a slideable gauge for engaging the guide blade towards the console wall;

an extendible attachment transiently fixed to the console wall.

2. The apparatus of claim 1 where the flat console base comprises a magnetically engageable material.

3. The apparatus of claim 1 where the flat console base is composed entirely of a magnetically engageable material.

4. The apparatus of claim 2 where he slideable gauge comprises a magnet.

5. The apparatus of claim 3 where the slideable gauge comprises a magnet.

6. The apparatus of claim 1 where the extendible attachment comprises a plurality of extensions.

7. The apparatus of claim 1 where the console wall comprises a magnetically engageable material.

8. The apparatus of claim 1 where the console wall is composed entirely of a magnetically engageable material.

9. The apparatus of claim 7 where the extendible attachment is transiently disposed on the console wall by a magnet.

10. The apparatus of claim 8 where the extendible attachment a transiently disposed on the console wall by a magnet.

11. The apparatus of claim 7 where the extendible attachment is composed of a magnet.

12. The apparatus of claim 8 where the extendible attachment is composed of a magnet.

13. A method for adjusting a blade set of a hair clipper using an L-shaped console comprising magnetically engageable material having a flat base and a wall, the blade set having a cutting blade with a plurality of teeth, a guide plate, and a guide blade with a plurality of teeth, comprising:

placing the guide blade on the flat console base whereby the teeth of the guide blade face the console wall;

slideably attaching the guide plate to the guide blade;

mounting the cutting blade on the guide plate whereby the teeth of the cutting blade face the console wall and the cutting blade is slideably adjustable relative to the guide blade;

disposing a slideable gauge on the flat console base;

sliding the guide blade on the flat console base toward the console all by engaging the guide blade with the slideable gauge;

engaging the teeth of guide blade against the console wall, transiently disposing an extendible attachment on the console wall to a desired depth substantially perpendicular to the console wall in a direction towards the teeth of the cutting blade;

slideably adjusting the cutting blade whereby teeth of the cutting blade engage against the extendible attachment;

securing the cutting blade to the guide blade via guide screws whereby the teeth of the cutting blade are fixed relative to the teeth of the guide blade.

14. The method of claim 13, wherein the disposing step further comprises disposing a magnet on the slideable gauge to magnetically engage the flat console base.

15. The method of claim 13, wherein the transiently disposing step comprises transiently disposing the extendable attachment on the console wall by a magnet.

* * * * *